(12) United States Patent
Carnevale et al.

(10) Patent No.: US 7,024,613 B2
(45) Date of Patent: Apr. 4, 2006

(54) METHOD AND APPARATUS FOR IMPLEMENTING INFINIBAND TRANSMIT QUEUE

(75) Inventors: Michael Joseph Carnevale, Rochester, MN (US); Charles Scott Graham, Rochester, MN (US); Daniel Frank Moertl, Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 10/359,777

(22) Filed: Feb. 6, 2003

(65) Prior Publication Data

US 2004/0158795 A1    Aug. 12, 2004

(51) Int. Cl.
G11C 29/00 (2006.01)
H04L 12/56 (2006.01)

(52) U.S. Cl. ...................... 714/763; 370/412

(58) Field of Classification Search ................ 714/763, 714/718, 723, 748, 749, 712, 54, 48, 42, 714/3, 4, 5, 7; 711/100; 370/412, 413, 379, 370/382, 429, 363, 378, 383
See application file for complete search history.

(56) References Cited

U.S. PATENT DOCUMENTS 6,449,695 B1 * 9/2002 Bereznyi et al. ............ 711/134
2003/0058875 A1 * 3/2003 Arndt et al. ................ 370/412
2004/0010594 A1 * 1/2004 Boyd et al. ................. 709/227

* cited by examiner

*Primary Examiner*—Christine T. Tu
(74) *Attorney, Agent, or Firm*—Joan Pennington

(57) ABSTRACT

A method, apparatus and computer program product are provided for implementing a transmit queue. A queue pair context memory is provided for storing a set of pointers for each queue pair. The set of pointers are used to control the transmit queue for receiving, processing, and sending messages. Responsive to identifying an error for a queue pair, a limit pointer enable bit and a limit pointer to identify a last request for processing after the error are stored in the queue pair context memory for the queue pair.

19 Claims, 7 Drawing Sheets

METHOD AND APPARATUS FOR IMPLEMENTING INFINIBAND TRANSMIT QUEUE

RELATED APPLICATION

A related U.S. patent application Ser. No. 10/360,252, entitled METHOD AND APPARATUS FOR IMPLEMENTING GLOBAL TO LOCAL QUEUE PAIR TRANSLATION by Michael Joseph Carnevale, Charles Scott Graham, Daniel Frank Moertl, and Timothy Jerry Schimke, and assigned to the present assignee is being filed on the same day as the present patent application.

FIELD OF THE INVENTION

The present invention relates generally to the data processing field, and more particularly, relates to a method, apparatus and computer program product for implementing a transmit queue.

DESCRIPTION OF THE RELATED ART

Input/output (I/O) networks, such as system buses, can be used for the processor of a computer to communicate with peripherals such as network adapters. However, constraints in the architectures of common I/O networks, such as the Peripheral Component Interface (PCI) bus, limit the overall performance of computers. As a result new types of I/O networks have been introduced.

One new type of I/O network is known and referred to as the InfiniBand network. The InfiniBand network replaces the PCI or other bus currently found in computers with a packet-switched network, complete with zero or more routers. A host channel adapter (HCA) couples the processor to a subnet, and target channel adapters (TCAs) couple the peripherals to the subnet. The subnet typically includes at least one switch, and links that connect the HCA and the TCAs to the switches. For example, a simple InfiniBand network may have one switch, to which the HCA and the TCAs connect through links. Topologies that are more complex are also possible.

InfiniBand networks can interconnect with communication networks. For instance, an Ethernet network adapter may be installed that enables communication over an Ethernet network, which is a common type of communication network. The network adapter has its own TCA for coupling to an InfiniBand network. The InfiniBand specification provides a raw datagram mode of communication to bridge packets received from an Ethernet network for transmission over an InfiniBand network, and viceversa.

InfiniBand networks provide for communication between TCAs and HCAs in a variety of different manners. In the InfiniBand network data flows between end nodes on logical connections known as Queue Pairs (QPs) across a switched point-to-point fabric. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

InfiniBand networks allow for a number of different transport services, including reliable and unreliable connections, reliable and unreliable datagrams, and raw packet support. In unreliable connections and datagrams, acknowledgments are not generated, and packet ordering is not guaranteed. In reliable connections and datagrams, acknowledgments and packet sequence numbers for guaranteed packet ordering are generated. Duplicate packets are rejected, and missing packets are detected.

The InfiniBand (IB) architecture has two requirements that are problematic to implement in hardware. The first requirement is to back-up and retransmit earlier packets if acknowledge packets are not received. The second is to continue processing earlier packets after a later packet encounters an error.

A need exists for an effective mechanism for handling in an efficient, effective, and a straightforward manner compliance with particular I/O network requirements, such as the InfiniBand requirements for back-up and retransmit earlier packets if acknowledge packets are not received and to continue processing earlier packets after a later packet encounters an error.

SUMMARY OF THE INVENTION

A principal object of the present invention is to provide a method, apparatus and computer program product for implementing a transmit queue. Other important objects of the present invention are to provide such method, apparatus and computer program product for implementing a transmit queue substantially without negative effect and that overcome some of the disadvantages of prior art arrangements.

In brief, a method, apparatus and computer program product are provided for implementing a transmit queue. A queue pair context memory is provided. A set of pointers for each queue pair is stored in the queue pair context memory. The set of pointers are used to control the transmit queue for receiving, processing, and sending messages. Responsive to identifying an error for a queue pair, a limit pointer enable bit and a limit pointer to identify a last request for processing after the error are stored in the queue pair context memory for the queue pair.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
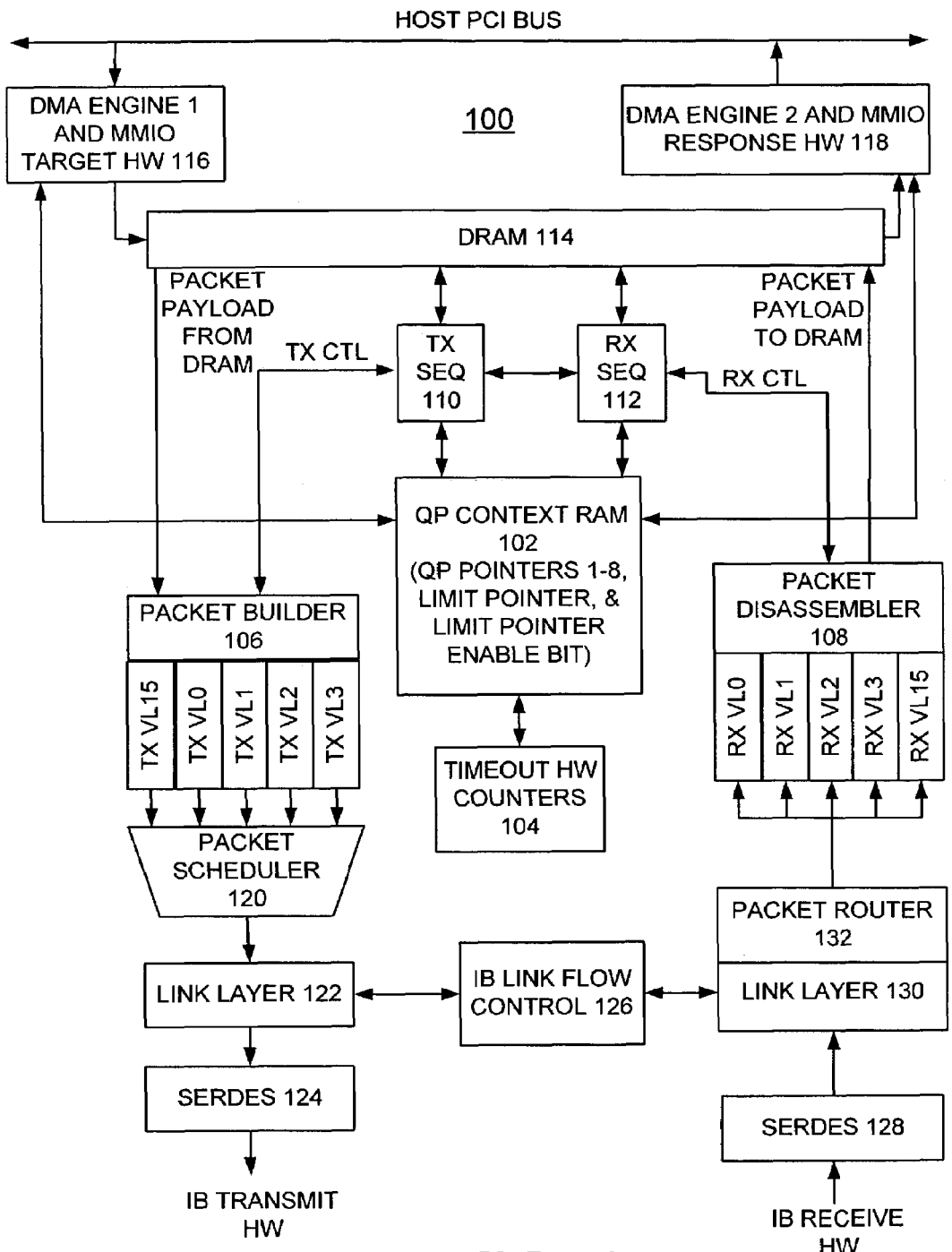
FIG. 1 is a block diagram representation illustrating an InfiniBand (IB) apparatus for implementing methods for InfiniBand transmit queue in accordance with the preferred embodiment.

Having reference now to the drawings, in FIG. 1, there is shown a network system generally designated by the reference character 100 for implementing methods for transmit queue flow control in accordance with the preferred embodiment. Network system 100 complies with InfiniBand requirements and is described generally as InfiniBand (IB) apparatus 100; however, it should be understood that the present invention is not limited to InfiniBand networks and can be used for various other I/O network requirements.

FIG. 1 illustrates an application specific integrated circuit (ASIC) defining network system 100 that handles the transmission and reception of InfiniBand (IB) packets (messages). The present invention specifically deals with the transmission of, and the associated response of, IB request packets.

As shown in FIG. 1, the IB apparatus 100 includes a queue pair (QP) context random access memory (RAM) 102 connected to timeout hardware (HW) counters 104, a packet builder 106 and a packet disassembler 108. The QP context RAM 102 stores a set of queue pointers for each queue pair (QP). QP Context RAM 102 for each QP includes a set of QP context RAM pointers 1–8, a Limit Pointer and a Limit Pointer Enable bit.

Figure 2:
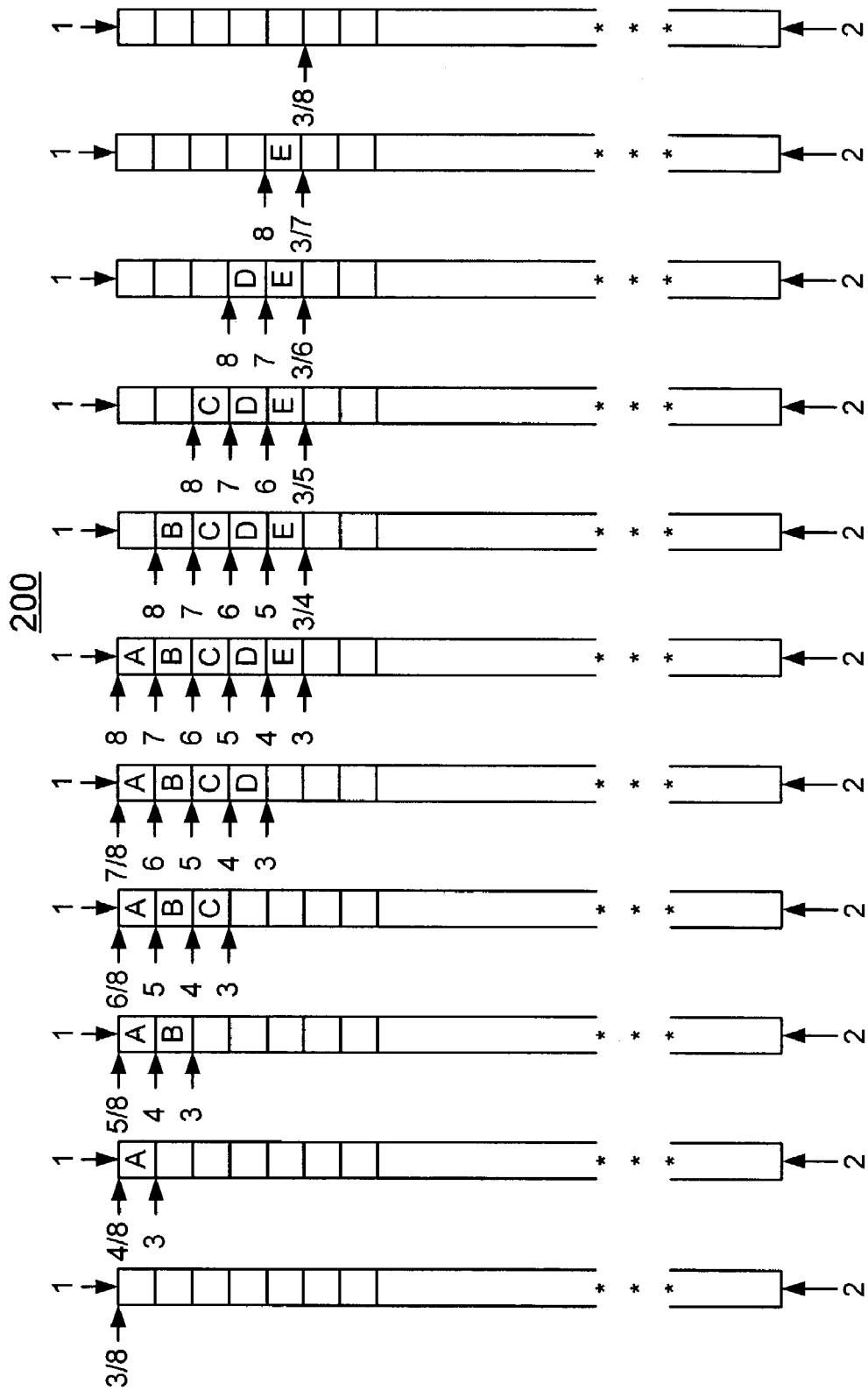
FIG. 2 is a block diagram representation illustrating a transmit queue over time with QP context RAM pointers used to control the transmit queue of the apparatus of FIG. 1 in accordance with the preferred embodiment.

QP context RAM pointers used to control an IB transmit queue arranged in accordance with the preferred embodiment are illustrated and described with respect to FIG. 2. IB apparatus 100 includes a transmit sequencer 110 coupled to the QP context RAM 102 and to the packet builder 106. A receive sequencer 112 is coupled to the local QP context RAM 102 and to the packet disassembler 108. A dynamic random access memory (DRAM) 114 for storing packet payload data is coupled to the transmit sequencer 110, the receive sequencer 112, the packet builder 106, and the packet disassembler 108. IB apparatus 100 includes a first direct memory access (DMA) engine 1 and memory mapped I/O (MMIO) target HW 116 and a second DMA engine 2 and MMIO response HW 118 coupled to a host bus, such as a host PCI bus and DRAM 114. Messages are received from a host operating system (OS) and payload data are transferred to and from the host PCI bus and the DRAM 114. DMA engine 1 and MMIO target HW 116 and DMA engine 2 and MMIO response HW 118 are coupled to the QP context RAM 102. MMIO target HW 116 allows the host OS to write ASCI registers and RAMs. MMIO response HW 118 allows the host OS to read ASCI registers and RAMs.

Packet builder 106 is coupled to InfiniBand (IB) transmit hardware via a packet scheduler 120, a link layer 122, and a serializer-deserializer (SERDES) 124. Packet payload data are transferred from the DRAM 114 to the packet builder 106. An IB link flow control 126 is coupled to the link layer 122. Packet disassembler 108 is coupled to IB receive hardware via a SERDES 128, a link layer 130, and a packet router 132. IB link flow control 126 is coupled to the link layer 130. Packet payload data are transferred from the packet disassembler 108 to the DRAM 114. As shown in FIG. 1, packet builder 106 includes a plurality of transmit (TX) virtual lanes (VLs) and packet disassembler 108 includes a plurality of receive (RX) VLs for multiple queue pairs (QPs).

In accordance with features of the preferred embodiment, an IB transmit queue and associated pointers are provided that allow compliance with InfiniBand (IB) requirements in an efficient, effective, and a straightforward manner. The InfiniBand (IB) architecture requires the IB responder to send acknowledge packets back to the IB requester if the connection type is reliable. The incoming acknowledge packets can be of several types including read response acknowledge packets or a response to a read request by an IB requester; ordinary acknowledge packets or a response to a write request by an IB requester; and negative acknowledge packets or a response from an 1B responder that indicates an error or failure. The IB requester may have to back up and retransmit packets from the point of failure indicated in the negative acknowledge packet (NAK packet). The IB requester may have to back up and retransmit for other reasons as well, such as missing read response packets lost in the network, out of order acknowledge packets or an acknowledge timeout condition that indicates an acknowledge or response from the IB responder has not arrived back to the IB requester. The IB requester needs to keep track of the history of what packets (requests) have been transmitted, and what requests have been acknowledged in order to properly back up when conditions warrant doing so. The IB transmit queue and associated pointers in accordance with the preferred embodiment efficiently and effectively enable the InfiniBand requirements for back-up and retransmit earlier packets if acknowledge packets are not received.

The IB transmit queue and associated pointers in accordance with the preferred embodiment efficiently and effectively enable the Infini Band requirements to continue processing earlier packets after a later packet encounters an error. The IB architecture has sequential semantics; that is the IB architecture requires that the IB requester report back status of the requests in the order it was received. This is difficult if the IB requester is working on multiple requests concurrently. For example, the IB requester could have received three requests (A,B,C) to perform from a software client. At a given point in time the IB requester might be prefetching data to build packets for request C, sending packets for request B, and waiting for acknowledge packets for the packets already transmitted for request A. If an error is encountered during the fetch of data for request C if cannot be immediately reported to the software client because the software client would assume requests A and B to complete before reporting the error. The present invention provides an enhanced IB transmit queue and pointers to accomplish the error processing function with minimal hardware complexity.

In accordance with features of the invention, the IB transmit queue and associated pointers provide the following advantages: Back up is handled in a less complicated manner than conventional arrangements. Processing after an error is handled in an efficient manner. Multiple errors within a single QP are handled correctly. In the example above, this would be request A or B encountering an error after request C's error. The handling for back up and error processing are orthogonal and can happen concurrently. In the above example, this would be request A or B requiring back up after an error in request C. The handling for all of the QPs is disjoint, and this processing occurs independently and concurrently on all QPs.

Referring also now to FIG. 2, there is shown a transmit queue over time generally designated by the reference character 200 together with QP context RAM pointers 1–8 in accordance with the preferred embodiment. The QP context RAM pointers residing in QP contest RAM 102 are used to control the transmit queue 200. There is one set of QP context RAM pointers per QP. QP context RAM pointers 1–8 point to locations in DRAM 114 and are defined as follows:

Pointer 1: Top TX Pointer. Pointer to the start of the queue 200.

Pointer 2: Bottom TX Count Pointer. Pointer to the end or wrap boundary of the queue 200.

Pointer 3: Msg TX Current Pointer. Pointer to where the next message from the Host OS will be placed.

Pointer 4: Host TX WRT DMA Pointer. Pointer to the next entry that may need to DMA data from Host OS to DRAM 114.

Pointer 5: IB TX Current Pointer. Pointer to the next entry that will be sent on the IB bus.

Pointer 6: IB TX Ack Pointer. Pointer to the next entry that is waiting for IB Acknowledge packets from the responder.

Pointer 7: Host TX RD DMA Pointer. Pointer to the next entry that may need to DMA data from DRAM 114 to the Host OS.

Pointer 8: Host TX Done Pointer. Pointer to the next entry that is waiting to send a completion message to the Host OS.

In FIG. 2, five messages A, B, C, D, and E are shown being queued from the Host OS, processed, and completed for the same queue 200 over time. First the transmit queue is empty as shown at the left side of FIG. 2. When messages are received from the Host OS and queued, pointer 3 is incremented. With pointer 3>pointer 4 or (3>4), the DMA engine 116 is started, data for operation "A" is DMAed, and pointer 4 is incremented. With pointer 4>pointer 5 or (4>5), the packet builder 106 is started and the packets for operation "A" are sent on the IB interface. With pointer 5>pointer 6 then the HW is waiting for IB acknowledge packets. As IB acknowledge packets are received they are processed, when the entire message has been acknowledged, pointer 6 is incremented. With pointer 6>pointer 7 or (6>7), then the DMA engine 118 is started, data for operation "A" is DMAed to the Host OS and pointer 7 is incremented. When pointer 7>pointer 8 or (7>8), then a completion message is sent to the Host OS indicating the operation has completed and pointer 8 is then incremented.

It should be understood that the queue depth is programmable, for example, a programmable number N of entries is allowed on the queue 200. Queue 200 can have a large queue depth that is set based upon the size of the available DRAM 114. Such a large queue depth allows a large number of commands to be in progress. Also since the queue is a circular FIFO, this also provides a trace of the last N commands that were issued.

Referring now to FIGS. 3, 4, 5, and 6, there are shown flow charts illustrating transmit queue operations of IB apparatus 100 in accordance with the preferred embodiment. In operation, the TX sequencer 110 in FIG. 1 polls the QP Context RAM 102 to detect any IB request packets to send for a Queue Pair (QP). The Host OS generates a request message and places the request message on the queue 200 in FIG. 2. When the message is put on the queue 200, pointer 3 is incremented and the updated value is written to the QP Context RAM 102. If the increment of a pointer causes the pointer to point past the end of the queue 200, the new pointer value is set equal to the top of the queue.

Figure 3:
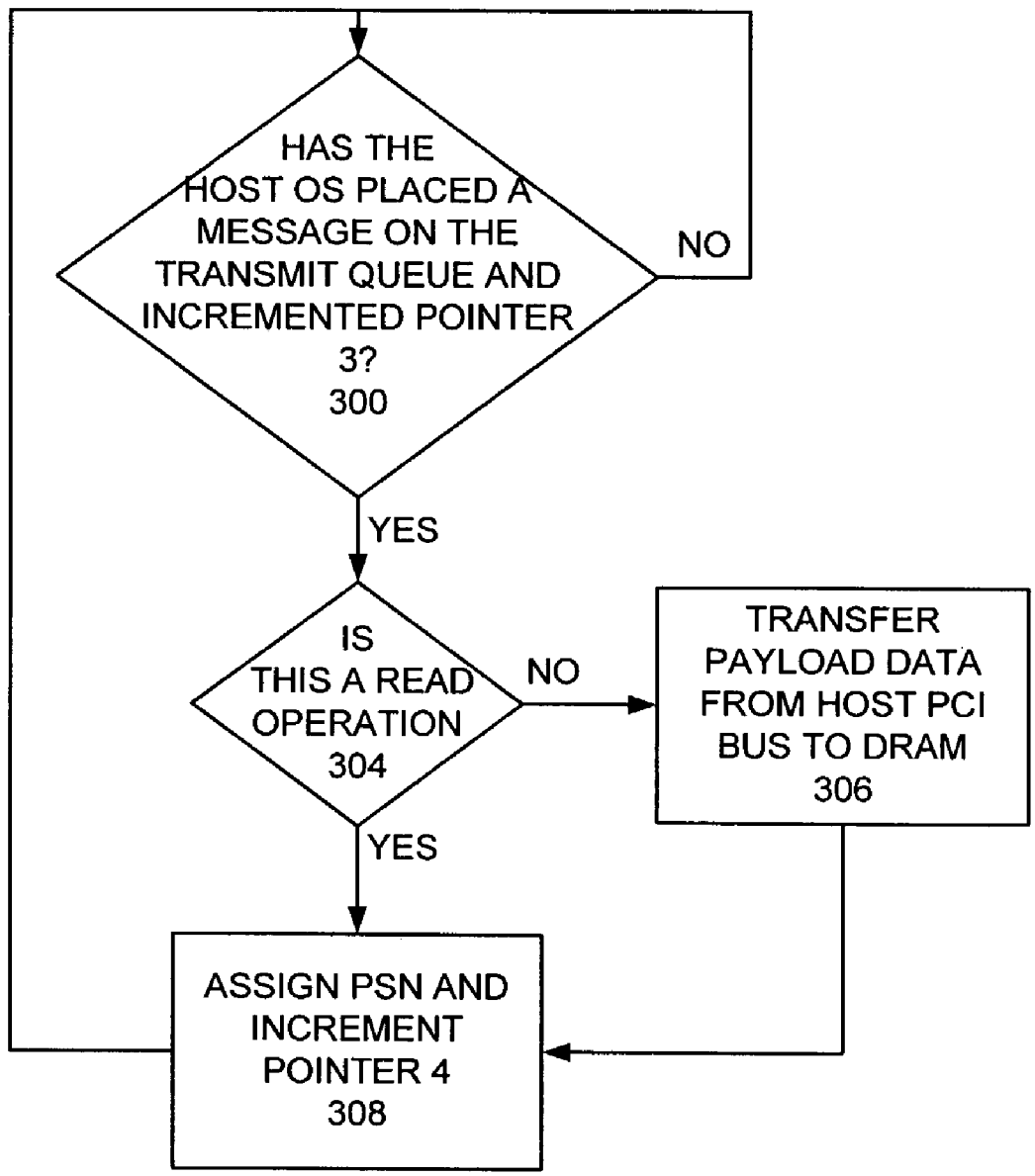
FIGS. 3, 4, 5, and 6 are diagrams illustrating transmit queue operations of the apparatus of FIG. 1 in accordance with the preferred embodiment.

Referring now to FIG. 3, DMA engine 116 in FIG. 1 is also polling the QP Context RAM 102 and detects when the Host OS has placed a request message on the queue 200 and incremented pointer 3 as indicated in a decision block 300. Checking if the message that was just placed on the queue is a read operation is performed as indicated in a decision block 304. If the message that was just placed on the queue is a write operation, the DMA engine 116 will transfer payload data from the PCI bus connected to the Host to DRAM 114 as indicated in a block 306. After transferring the payload data, the IB Packet Sequence Numbers (PSNs) for this operation are assigned as indicated in a block 308. After the payload data has been transferred to DRAM 114, pointer 4 in the QP Context RAM 102 also is incremented and updated at block 308. If the message that was just placed on the queue is a read operation, the DMA engine 116 will assign the PSNs and then just increment and update pointer 4 in the QP Context RAM 102.

Figure 4:
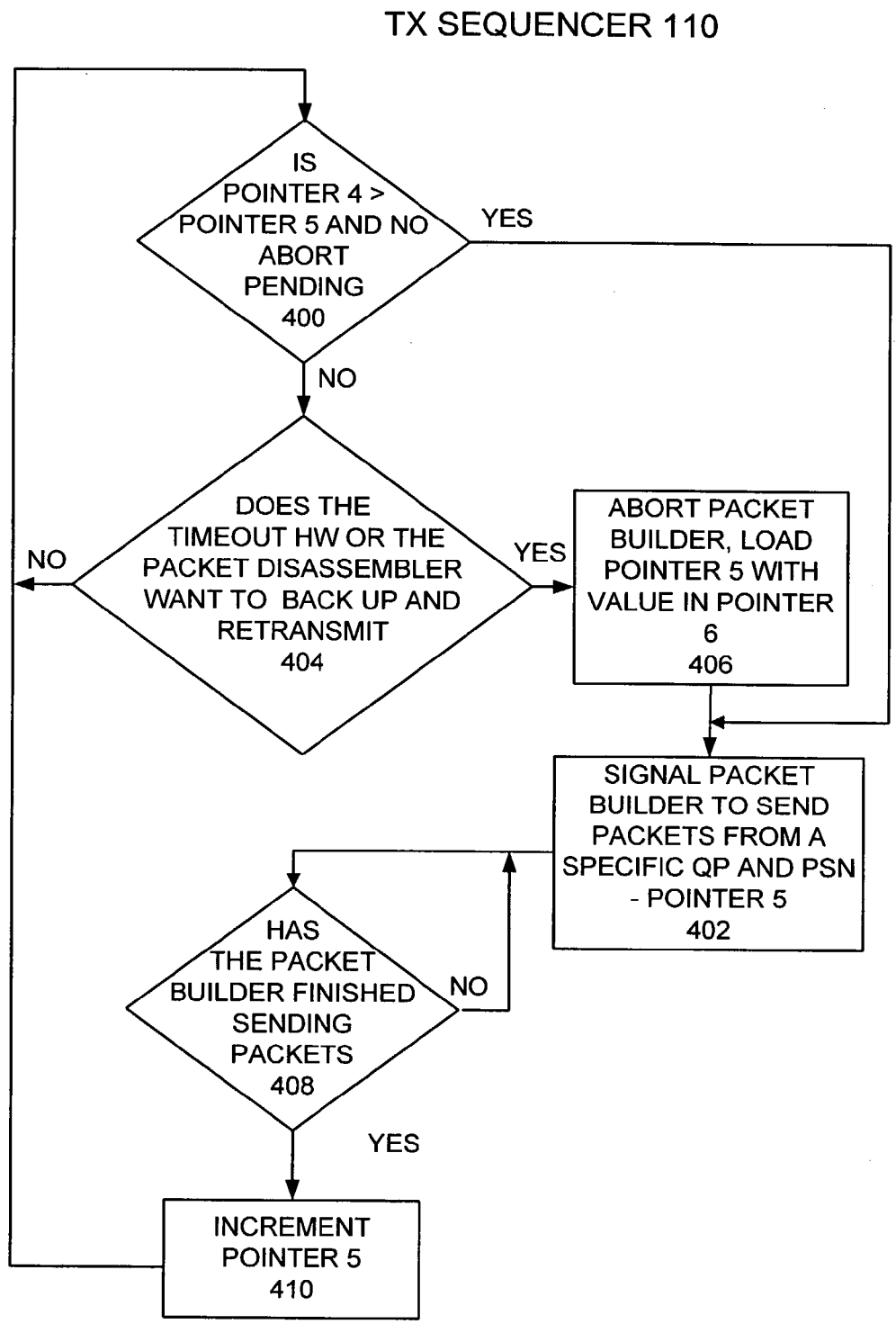

Referring now to FIG. 4, operations of the TX sequencer 110 are shown. At this point, the TX sequencer 110 now detects pointer 4>pointer 5 with no abort pending as indicated in a decision block 400. Then the TX sequencer 110 signals the packet builder 106 that it has packets to send for a certain QP number and PSN using pointer 5 as indicated in a block 402. The packet builder 106 builds the packets for the message, using the PSNs provided, and sends the packets out onto the IB interface. Checking whether the timeout HW 104 or the packet disassembler 108 want to back up and retransmit is performed as indicated in a decision block 404. If so, then the packet builder is aborted, and the IB TX current pointer 5 is loaded with the value in pointer 6 as indicated in a block 406. Then the TX sequencer 110 signals the packet builder 106 at block 402. Checking whether the packet builder 106 has finished sending packets is performed as indicated in a decision block 408. When the last packet of a message has been sent on the IB interface, pointer 5 is incremented and updated in the QP Context RAM 102 as indicated in a block 410. Then the sequential operations of the TX sequencer 110 return to decision block 400.

Figure 5:
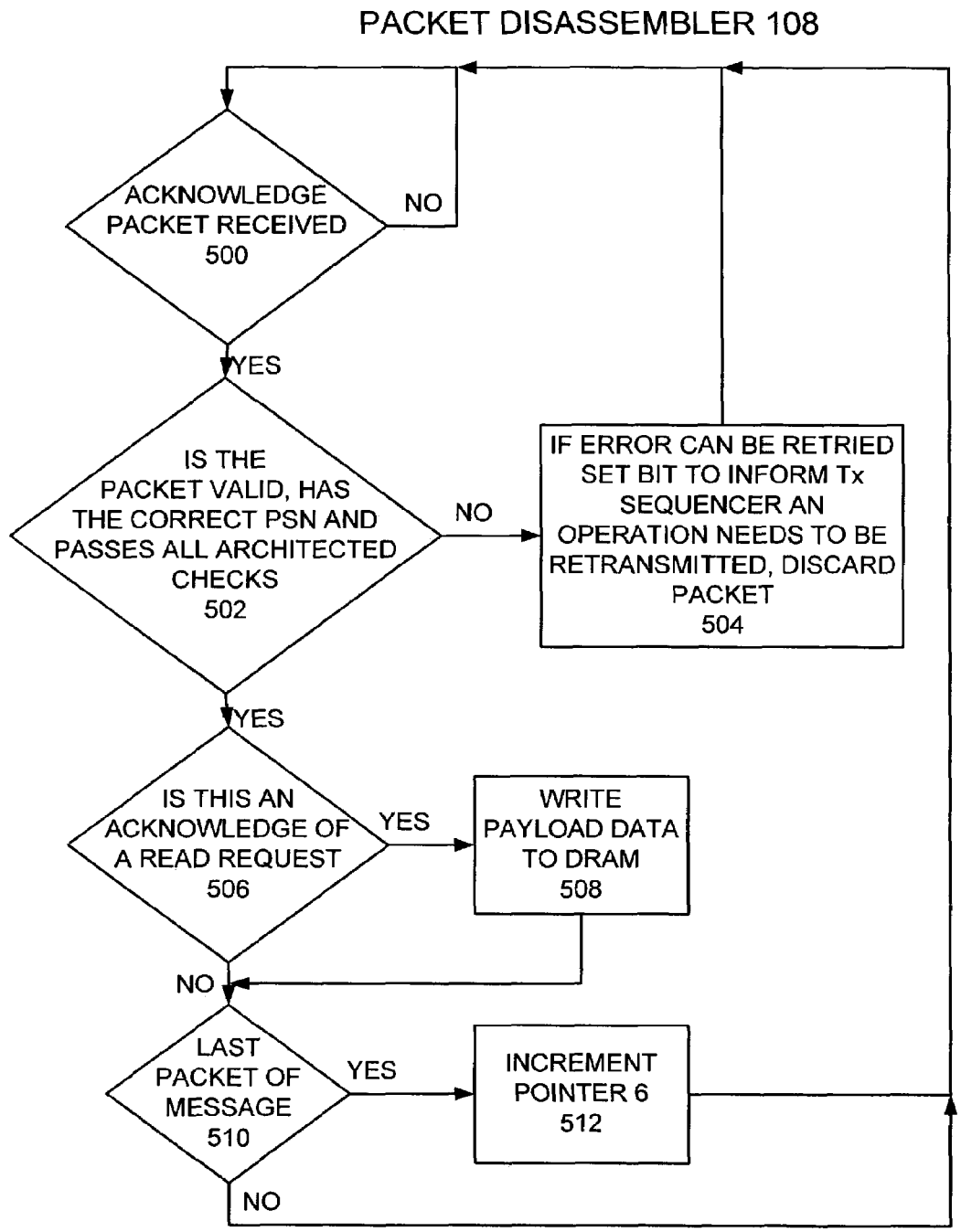

Referring now to FIG. 5, operations of the packet disassembler 108 are shown. Sometime later the IB responder sends acknowledge packets to indicate the successful reception of the IB message (packets). The packet disassembler 108 receives these packets as indicated in a decision block 500 and verifies that the packets are valid and in the proper sequence as indicated in a decision block 502. If an error can be retried, the packet disassembler 108 sets a bit to inform the TX sequencer 110 an operation needs to be retransmitted, and the packet is discarded as indicated in a block 504. Checking if the acknowledge packets are for a read request is performed as indicated in a decision block 506. If the newly completed message was a read request, the packet disassembler 108 has also stored the read response payload data to DRAM 114. If the last acknowledge packet of a message is received as indicated in a decision block 510, then the packet disassembler 108 increments and updates pointer 6 in the QP Context RAM as indicated in a block 512.

Figure 6:
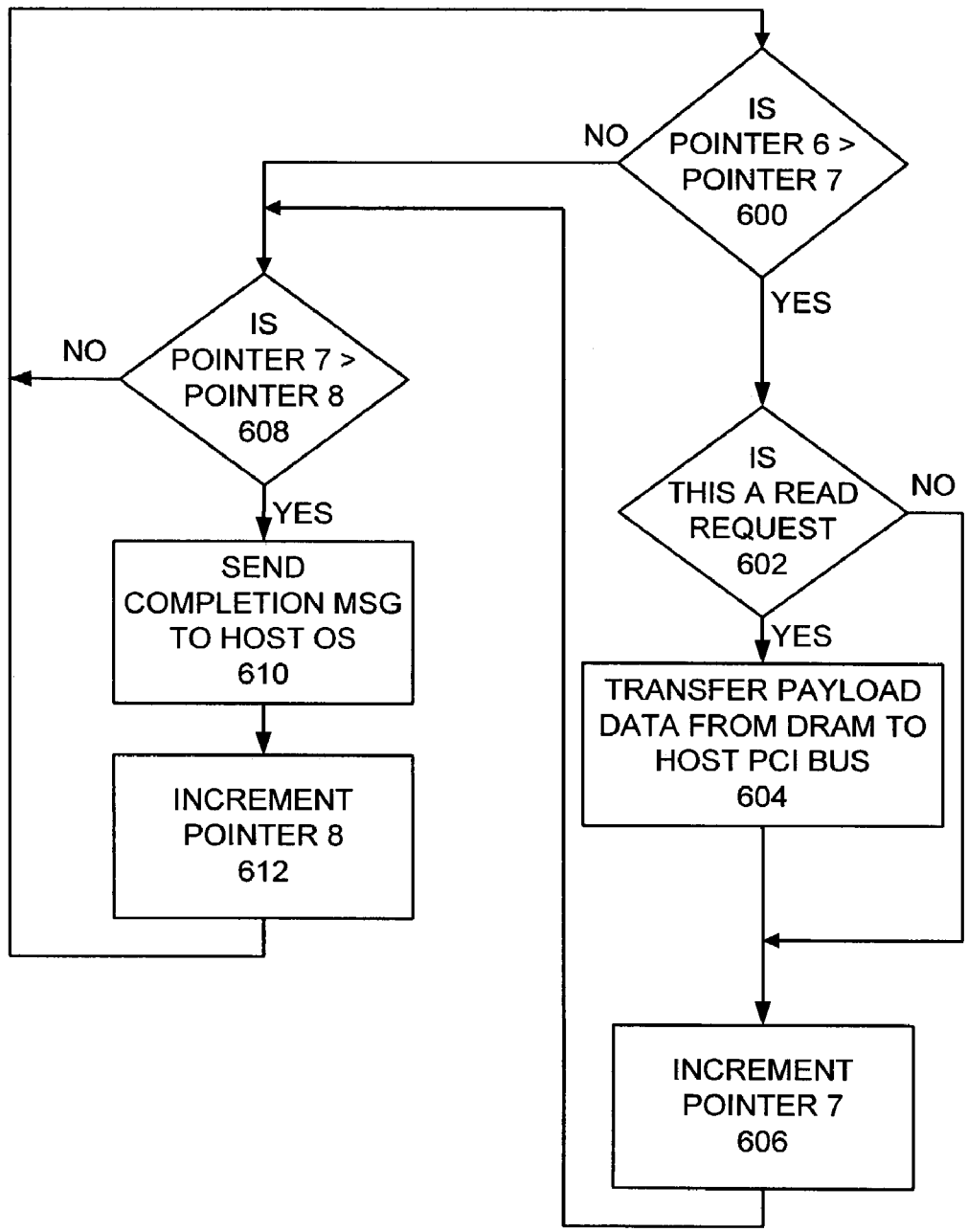

Referring now to FIG. 6, operations of the DMA engine 2 118 are shown. The DMA engine 2 118 in FIG. 1 is also polling the QP Context RAM 102 and detects if pointer 6>pointer 7 as indicated in a decision block 600. If the message was a read request as indicated in a decision block 602, the DMA engine 2 118 transfers the read response payload data from DRAM 114, across the PCI bus to the Host as indicated in a block 604. Then the DMA engine 2 118 increments and updates pointer 7 in the QP Context RAM 102 as indicated in a block 606. If the message was a write request, the DMA engine only increments and updates pointer 7 in the QP Context RAM 102 at block 606. If determined the pointer 6 was not greater pointer 7 at decision block 600 or after pointer 6 is incremented at block 206, then checking if pointer 7>pointer 8 is performed as indicated in a decision block 608. The Host OS is notified that pointer 7>pointer 8 as indicated in a block 610; this indicates the IB message was completed and acknowledged by the IB responder. As indicated in a block 610, the DMA engine 2 118 increments and updates pointer 8 in the QP Context RAM 102; this frees up or retires the entry in the queue for the message. Then the sequential operations of the DMA engine 2 118 return to decision block 600.

A result of the queue structures illustrated in FIG. 2 and described above, backing up and resending previous sent packets is simplified. Error processing also is simplified. If the Timeout HW 104 detects a previously sent message did not get all the responses back after a certain time period has expired, the TX Sequencer 110 is notified, the current transmission of packets, where pointer 5 is pointing to in the queue 200, is aborted, and pointer 5 is loaded with the value in pointer 6 and the re-transmission of packets for the message begins again starting with the PSN pointer 6 was expecting. Information about the previously sent message is still in the queue and has not been retired since pointer 6 never caught up to pointer 5 due to response packets not being returned. If the packet disassembler 108 receives an out of sequence acknowledge packet or a negative acknowledge, the TX Sequencer 110 is again notified, the current transmission of packets, where pointer 5 is pointing to in the queue 200, is aborted, pointer 5 is loaded with the value in pointer 6 and the re-transmission of packets of the message begins again starting with the PSN pointer 6 was expecting.

In accordance with features of the invention, to add the capability to continue processing earlier requests after an error is encountered two new fields are added to the QP Context RAM 102 for each QP, the Limit Pointer and the Limit Pointer Enable bit. The Limit Pointer is the last request for which processing is to continue after an error. The Limit Pointer Enable bit enables checking of the Limit Pointer by the hardware engines 108, 110, 116 and 118.

When an error occurs, the particular HW engine 108, 110, 116 or 118 that encounters the error, generates an interrupt for the QP in error. Firmware processes the interrupt and reads the QP Context RAM 102 to determine which HW engine 108, 110, 116 or 118 had the error and which request it was processing when the error occurred. Firmware writes the Limit Pointer to the request prior to the request which encountered the error and sets the Limit Pointer Enable bit in the QP Context RAM 102. Each HW engine 108, 110, 116 and 118 always reads the Limit Pointer enable bit in the QP Context RAM 102 prior to performing an action for the QP that it is about to process. The HW engine 108, 110, 116 and 118 will halt processing of all requests after the Limit Pointer value is reached. For example, in addition to pointer 4>pointer 5, it is also required that pointer 5<Limit Pointer to enable the engines 108, 110, 116 and 118 to perform work. Additionally when the Limit Pointer Enable bit is set, the DMA engine 2 118 compares the Limit Pointer to pointer 8 every time pointer 8 is incremented. If the pointers are equal, then an interrupt is raised to firmware. This interrupt notifies firmware that processing has finished for all requests prior to the request which encounters the error. Firmware otherwise would have to poll the QP Context RAM to determine when the earlier requests have finished. When firmware receives the interrupt it can now send an error response for the original request which encountered the error because all earlier requests have completed successfully.

Backing up is still accomplished in the same manner as described above, and is unaffected by the error processing that is occurring. It is possible for another engine to encounter an error, or for the engine which encountered the first error to experience another error. In this case that results in the error being moved to an earlier request and the Limit Pointer being moved up to the appropriate earlier request. The second error is now the one that is reported since its request was received first even though that error was the second to actually occur.

Figure 7:
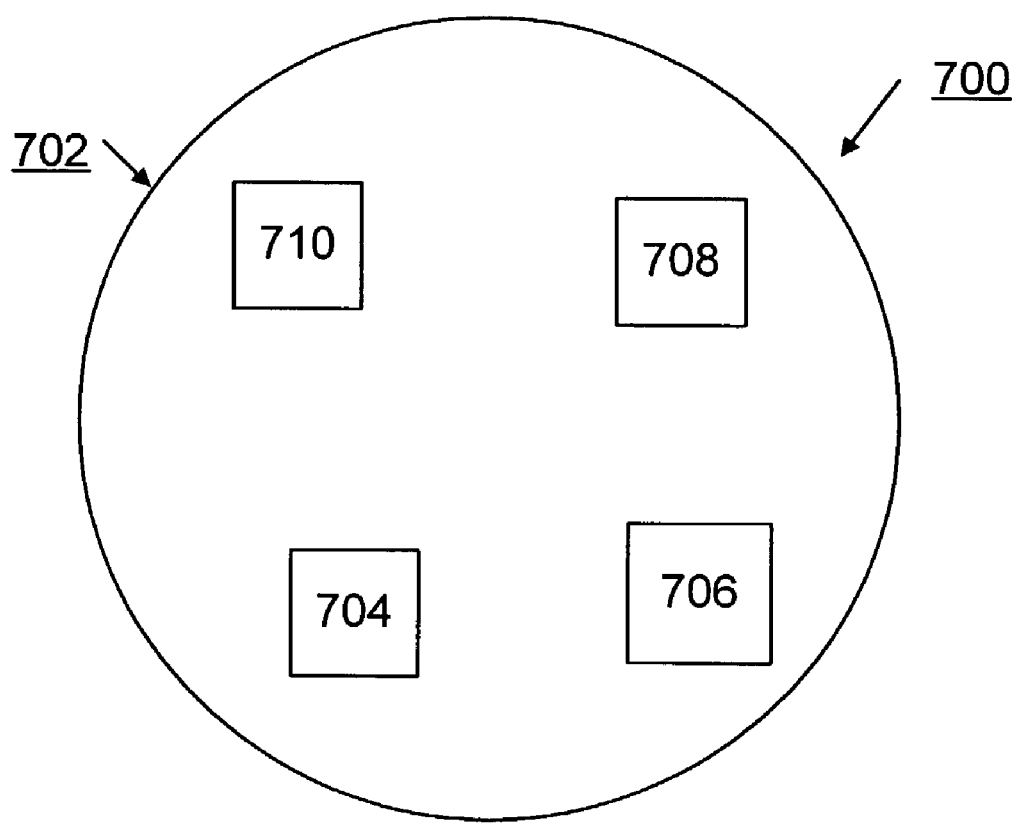
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing a transmit queue of the preferred embodiment in the system 100 of FIG. 1.

A sequence of program instructions or a logical assembly of one or more interrelated modules defined by the recorded program means 704, 706, 708, 710, direct the network system 100 for implementing a transmit queue of the preferred embodiment.

While the present invention has been described with reference to the details of the embodiments of the invention shown in the drawing, these details are not intended to limit the scope of the invention as claimed in the appended claims.

What is claimed is:

1. A method for implementing a transmit queue in a network system comprising the steps of:
   providing a queue pair context memory;
   storing a set of pointers for each queue pair in said queue pair context memory;
   utilizing said set of pointers to control the transmit queue for receiving, processing, and sending messages;
   identifying an error for a queue pair; and
   storing in said queue pair context memory for said queue pair a limit pointer enable bit and a limit pointer to identify a last request for processing after said error.

2. A method as recited in claim 1 wherein the step of providing said queue pair context memory includes the step of providing a internal random access memory (RAM) for storing said set of pointers for each queue pair.

3. A method as recited in claim 1 wherein the step of storing said set of pointers includes the steps of storing a first pointer to a start of the transmit queue, storing a second pointer to an end of the transmit queue, storing a third pointer to a current message transmit to where a next message will be placed on the transmit queue.

4. A method as recited in claim 3 further includes the step of storing a fourth pointer to a next entry for host transmit write; storing a fifth pointer to a next entry to transmit on a network bus; storing a sixth pointer to a next entry waiting for an acknowledge packet.

5. A method as recited in claim 4 further includes the step of storing a seventh pointer to a next entry for host transmit read; and storing an eighth pointer to a next entry waiting to send a completion message.

6. A method as recited in claim 1 wherein the utilizing step includes the steps of providing a transmit sequencer for identifying a back up and retransmit condition, and loading a pointer to a next entry to transmit on a network bus with a stored pointer value to a next entry waiting for an acknowledge packet.

7. A method as recited in claim 1 wherein the utilizing step includes the steps of providing a DMA engine for identifying a message placed on the transmit queue; and incrementing a pointer to a next entry for host transmit write.

8. A method as recited in claim 1 wherein the utilizing step includes the steps of providing a transmit sequencer for signaling a packet builder to send packets and transmit sequencer for incrementing a pointer to a next message entry to transmit on a network bus.

9. A method as recited in claim 1 wherein the utilizing step includes the steps of providing a packet disassembler for identifying an acknowledge packet; said packet disassembler for incrementing a pointer to a next entry waiting for an acknowledge packet.

10. A method as recited in claim 1 wherein the utilizing step includes the steps of providing a DMA engine for identifying a read request and for incrementing a pointer to a next entry for host transmit read.

11. A method as recited in claim 1 wherein the utilizing step includes the steps of providing a DMA engine for sending a completion message to a host and for incrementing a pointer to a next entry waiting to send a completion message.

12. A method as recited in claim 1 includes the steps of comparing said limit pointer to a pointer to a next entry waiting for processing.

13. Apparatus for implementing a transmit queue in a network system comprising:
- a queue pair context memory for storing a set of pointers for each queue pair;
- a dynamic random access memory (DRAM) for storing payload data for each said queue pair;
- a packet builder coupled to said DRAM for sending packets for a queue pair;
- a transmit sequencer coupled to said queue pair context memory, said DRAM, and said packet builder; said transmit sequencer for utilizing said set of pointers to control the transmit queue and for signaling said packet builder for sending packets for said queue pair;
- said transmit sequencer, responsive to an identified error for said queue pair, for utilizing a limit pointer stored in said queue pair context memory to identify a last request for processing after said error.

14. Apparatus as recited in claim 13 wherein said queue pair context memory includes an internal random access memory (RAM) for storing said set of pointers for each queue pair.

15. Apparatus as recited in claim 13 wherein said transmit sequencer, is responsive to an identified back up and retransmit condition, for loading a pointer to a next entry to transmit on a network bus with a stored pointer value to a next entry waiting for an acknowledge packet.

16. Apparatus as recited in claim 13 includes a DMA engine for identifying a message placed on the transmit queue; and for incrementing a pointer to a next entry for host transmit write.

17. Apparatus as recited in claim 13 includes a packet disassembler for identifying an acknowledge packet; said packet disassembler for incrementing a pointer to a next entry waiting for an acknowledge packet.

18. Apparatus as recited in claim 13 includes a DMA engine for identifying a read request and for incrementing a pointer to a next entry for host transmit read.

19. A computer program product for implementing a transmit queue in a network system, said computer program product including a plurality of computer executable instructions stored on a computer readable medium, wherein said instructions, when executed by the network system, cause the network system to perform the steps of:
- storing a set of pointers for each queue pair in a queue pair context memory;
- utilizing said set of pointers to control the transmit queue for receiving, processing, and sending messages;
- identifying an error for a queue pair; and
- storing in said queue pair context memory for said queue pair a limit pointer enable bit and a limit pointer to identify a last request for processing after said error.

* * * * *